3,634,531
PRODUCTION OF STYRENE
Rolf Platz, Mannheim, and Karl Gerhard Baur, Ludwigshafen, Germany, assignors to Badische Anilin- & Soda-Fabrik Aktiengesellschaft, Ludwigshafen (Rhine), Germany
No Drawing. Filed Oct. 27, 1969, Ser. No. 869,850
Claims priority, application Germany, Oct. 30, 1968, P 18 06 080.5
Int. Cl. C07c *15/10*
U.S. Cl. 260—669                                    6 Claims

ABSTRACT OF THE DISCLOSURE

The production of styrene by dehydrogenation of ethylbenzene with oxygen or a gas containing molecular oxygen in the presence of iodine, isolation of the crude styrene and distillation of the crude styrene with the recovery of pure styrene, wherein the crude styrene is in part catalytically hydrogenated.

Styrene is an important monomer.

The present invention relates to an improved process for the production of styrene by dehydrogenation of ethylbenzene with oxygen in the presence of iodine.

Many saturated organic compounds can be converted at elevated temperatures with oxygen or air under the catalytic influence of halogen, particularly bromine or iodine, into the corresponding unsaturated compounds. In this method (known as oxydehydrogenation) styrene is obtained in outstanding yields at very high conversions in the dehydrogenation of ethylbenzene in the presence of iodine (cf. P.S. patent specification No. 3,392,205). Because of the high conversion, the styrene obtained by oxydehydrogenation may be worked up in a simple way by distillation so that the process is particularly economical.

The unfavorable polymerization properties of the styrene prepared by the iodine method have hitherto prevented the process from being adopted by industry. Thus when the crude styrene is worked up there is always obtained a pure styrene which contains about 30 to 50 p.p.m. of iodine in the form of organic iodine compounds not precisely known and gives discolored products in the production of homopolymers or copolymers. Moreover styrene prepared by the iodine dehydrogenation method has a clearly lower polymerization rate and its use results in a lower molecular weight of the polymer. Traces of iodine in the styrene are responsible for the said discoloration which occurs particularly in the case of copolymers of styrene and acrylonitrile. The unfavorable molecular weight and polymerization rate are probably due to a content of 0.1% by weight of phenylacetylene in the pure styrene. Phenylacetylene cannot be separated from styrene by distillation, neither can a decrease in the iodine content be achieved by distillation in an economical manner. The iodine content in the styrene is caused by unstable organic iodine compounds which remain substantially in the residue during distillation and continually split off small amounts of iodine which pass into the distilate and react again with the styrene by addition.

The object of the invention is to provide a process for the production of styrene by dehydrogenation of ethylbenzene with oxygen in the presence of iodine in which a styrene is obtained which yields polymers or copolymers which are not discolored and which have a favorable molecular weight.

Another object of the invention is to provide a process for the production of styrene which exhibits polymerization rates comparable with those of styrene obtained conventionally.

In accordance with this invention these and other objects and advantages are achieved in a process for the production of styrnee by dehydrogenation of ethylbenzene with oxygen or a gas containing molecular oxygen in the presence of iodine, isolation of crude styrene and distillation of the crude styrene with the recovery of pure styrene, wherein the crude styrene is subjected to partial catalytic hydrogenation.

By the partial catalytic hydrogenation, the content of phenylacetylene in the crude styrene can be lowered from about 1000 p.p.m. to a value of less than 50 p.p.m. (which does not adversely affect the polymerization) without appreciable hydrogenation of styrene to ethylbenzene. At the same time the iodine content of the crude styrene in the form of iodine compounds is decreased in the process according to this invention from about 1% by weight to about 0.05% by weight. Iodine compounds still present after the partial catalytic hydrogenation surprisingly do not eliminate any iodine in the distillation of the crude styrene so that the pure styrene obtained has an iodine content of less than 1 p.p.m.

Examples of suitable hydrogenation catalysts are nickel, cobalt, rhodium, ruthenium and particularly platinum or palladium metals which may be supported on carrier materials such as active carbon, barium sulfate, silica gel or aluminum oxide. The hydrogenation catalyst may contain additions of regulators such as quinoline sulfide, thiourea, phenyl mustard oil or zinc.

Pure hydrogen may be used for the hydrogenation. Generally however technical-grade hydrogen is used. It is advantageous to use a mixture of hydrogen and an inert gas such as nitrogen, carbon dioxide and particularly carbon monoxide. Generally mixtures are used in which the volumetric ratio of hydrogen to inert gas is from 0.4:1 to 8:1.

It is advantageous to remove, prior to distillation, the hydrogen iodide formed by catalytic hydrogenation of the crude styrene. This may be done for example by carrying out the hydrogenation in the presence of a basic reagent. It is advantageous however first to carry out the partial hydrogenation and then to treat the crude styrene obtained from the hydrogenation with a basic reagent.

The basic reagent is generally used in an amount which lies between the amount necessary for the neutralization of the hydrogen iodide and an excess of about 10% beyond the said amount. The use of a larger excess, for example of 50%, is however not detrimental.

Examples of basic reagents are hydroxides, oxides and carbonates of the alkaline earth metals and of the alkali metals, alkalimetal salts or lower aliphatic carboxylic acids, and ammonia. Specific examples are sodium hydroxide, calcium hydroxide, lithium hydroxide, potassium carbonate and potassium acetate. It is advantageous to use the basic reagents in the form of aqueous solutions.

The partial hydrogenation of the crude styrene is generally carried out until the content of iodine in the form of iodine compounds and the content of phenylacetylene have been lowered to values below 50 p.p.m.

Partial hydrogenation may be carried out in the liquid phase or in the gas phase. When working in the liquid phase, it is advantageous to use temperatures of from −15° to 100° C., preferably from 40° to 100° C. Atmospheric pressure is usually used. It is also possible however to use subatmospheric pressure, for example 200 mm. Hg, or superatmospheric pressure, for example 2.5 atmospheres. Residence times are generally from thirty minutes to two hours depending on the hydrogenation temperature and the pressure used. Reaction in the liquid phase may be carried out using the amount of hydrogen stoichiometrically required for the hydrogenation of the phenylacetylene to styrene and the iodine compounds. It is preferred however to allow an excess of hydrogen (if desired diluted with an inert gas), particularly an amount of hydrogen lying between the stoichiometric amount and a 100% excess, to act on the crude styrene, the hydrogenating gas being advantageously recycled.

The crude styrene obtained from the partial hydrogenation in the liquid phase may be processed for example by treating the reaction product with aqueous ammonia, separating the aqueous phase and distilling the organic phase.

Partial hydrogenation in the gas phase is carried out for example by passing a gaseous reaction mixture of crude styrene, hydrogen and carbon monoxide in which the hydrogen is present for example in a 50% excess, over a catalyst of palladium and aluminum oxide.

Temperatures of from 50° to 150° C., preferably from 50° to 100° C., are usually used in hydrogenation in the gas phase. It is preferred to use subatmospheric pressure, particularly from 10 to 50 mm. Hg. The residence times in gas phase hydrogenation are usually from 0.1 to 10, preferably from 0.5 to 3, seconds.

The gaseous reaction mixture leaving the reactor is advantageously cooled by direct action of an aqueous solution of a basic reagent so that it is free from hydrogen iodide at the same time.

The amount of styrene hydrogenated to form ethylbenzene can be disregarded, particularly when using a catalyst containing a regulator, even at residence times which are longer than those specified for hydrogenation in the liquid or gas phase.

The following examples illustrate the invention.

EXAMPLE 1

An aluminum oxide to which 0.5% by weight of palladium and 0.2% by weight of zinc oxide have been applied is used as catalyst. 3 kg. per hour of crude styrene which has been prepared by oxydehydrogenation in the presence of iodine and which has previously been distilled off from the residue is passed at atmospheric pressure through a reactor which has been filled with 3000 ml. of the said catalyst. The residence time with reference to the reactor volume is one hour and the reaction temperature is 60° C. 400 liters per hour of a mixture of 50% by volume of hydrogen and 50% volume of carbon monoxide is passed as hydrogenation gas cocurrently through the reactor and recycled so that good gassing is ensured. The composition of the hydrogenating gas is kept constant by supplying fresh gas and withdrawing off gas. The liquid leaving the reactor is washed with 2 liters per hour of 10% by weight aqueous ammonia. The organic layer is then distilled, 2.7 kg. per hour of pure styrene being obtained.

The compositions of crude styrene before (BH) and after (AH) the catalytic hydrogenation and the composition of the pure styrene (PS) obtained after distillation are indicated in the following table (percent by weight):

|  | BH | AH | PS |
| --- | --- | --- | --- |
| Styrene, percent | 92.0 | 91.6 | 99.99 |
| Ethylbenzene, percent | 6.4 | 7.1 | |
| Phenylacetylene, p.p.m | 1,120 | 24 | 24 |
| Iodine (in the form of compounds containing iodine), percent | 0.85 | 0.035 | (¹) |

¹ Less than 1 p.p.m.

EXAMPLE 2

3 kg. per hour of a crude styrene prepared by the iodine method is passed in the gas phase at a pressure of 20 mm. Hg through a reactor which contains 3000 ml. of the catalyst described in Example 1. The reaction temperature is 80° C. and the residence time of the gas (with reference to the volume of the reactor) is 2.7 seconds. The vaporized crude styrene entering the reactor is mixed with a gas mixture of 80% by volume of hydrogen and 20% by volume of carbon monoxide which contains hydrogen in an excess of 50% with reference to the amount stoichiometrically required. The gaseous reaction product leaving the reactor is condensed by quenching with 2 liters per hour of a 15% by weight aqueous caustic soda solution. After the aqueous phase has been separated, the organic phase is distilled. 2.7 kg. per hour or pure styrene is obtained.

The compositions of crude styrene before (BH) and after (AH) the catalytic hydrogenation and of the pure styrene (PS) obtained after distillation are given in the following table in which percentages are by weight:

|  | BH | AH | PS |
| --- | --- | --- | --- |
| Styrene, percent | 93.4 | 93.1 | 99.99 |
| Ethylbenzene, percent | 5.2 | 5.6 | |
| Phenylacetylene, p.p.m | 940 | 6 | 6 |
| Iodine (in the form of compounds containing iodine), percent | 0.80 | 0.032 | ¹1 |

¹ P.p.m.

We claim:

1. A process for the production of styrene which comprises: reacting ethylbenzene with oxygen or a gas containing molecular oxygen in the presence of iodine; isolating the crude styrene formed in the reaction; subjecting the crude styrene to partial catalytic hydrogenation by reacting said crude styrene with gaseous hydrogen at temperatures up to 150° C. and at a pressure of from 10 mm. Hg to 2.5 atmospheres; and thereafter distilling the partially hydrogenated reaction product to obtain substantially pure styrene.

2. A process as claimed in claim 1 which comprises treating the partially hydrogenated crude styrene with a basic reagent prior to distillation.

3. A process as claimed in claim 1 which comprises distilling the crude styrene prior to the catalytic hydrogenation treatment.

4. A process as claimed in claim 1 wherein the hydrogenation is carried out with a mixture of hydrogen and inert gas in the volumetric ratio of from 0.4:1 to 8:1.

5. A process as in claim 1 wherein the hydrogenation is carried out in the gas phase at a pressure of from 10 to 50 mm. Hg and at a temperature of from 50 to 100° C.

6. A process as in claim 1 wherein the hydrogenation is carried out in the liquid phase at a pressure of from 200 mm. Hg to 2.5 atmospheres and at a temperature of from 40 to 200° C.

References Cited

UNITED STATES PATENTS 3,275,704   9/1966   Mill _____ 260—669 X

CURTIS R. DAVIS, Primary Examiner